United States Patent Office 3,641,122
Patented Feb. 8, 1972

3,641,122
PROCESS FOR THE PREPARATION OF
ALKENYL ESTERS
Gustave B. Bachman, West Lafayette, Ind., and Gerald
M. Tullman, Creve Coeur, Mo., assignors to Purdue
Research Foundation, Lafayette, Ind.
No Drawing. Filed Oct. 25, 1968, Ser. No. 770,838
Int. Cl. C07c 69/02
U.S. Cl. 260—497 R          4 Claims

ABSTRACT OF THE DISCLOSURE

A process for preparing alkenyl esters by reacting an aliphatic carboxylic acid anhydride, such as propionic anhydride, and an olefin represented by the formula

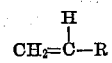

wherein R is hydrogen or an alkyl radical, for example, 1-octene, or by the formula

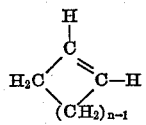

wherein $n$ is an integer ranging from 1 to about 10, for example, cyclohexene, in the presence of mercuric iodate.

SUMMARY OF THE INVENTION

This invention relates to a process for the preparation of alkenyl esters from aliphatic carboxylic anhydrides and olefins. In a particular aspect, this invention relates to a process for the preparation of alkenyl esters by the reaction of an aliphatic carboxylic acid anhydride and an olefin represented by the formula

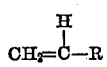

wherein R is hydrogen or an alkyl radical having, for example, from 1 to about 25 carbon atoms, or by the formula

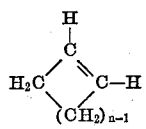

wherein $n$ is an integer ranging from 1 to about 10, in the presence of mercuric iodate.

Alkenyl esters are known to the art and have been employed in the formation of useful copolymers with polymerizable monomers, such as styrene, vinyl halides, vinyl acetate, glycidyl polyethers, etc., and the like. Representative references include U.S. Pat. No. 2,882,521 to Christenson et al. and the article by Walling and Pellon in Journal of American Chemical Society, volume 79 (4782–86) 1957.

It is an object of the present invention to provide a process for the preparation of alkenyl esters.

It is a further object of the present invention to provide a process for the preparation of alkenyl esters by the reaction of an aliphatic carboxylic acid anhydride and an olefin represented by the formula

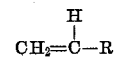

wherein R and $n$ are defined as above.

Other objects and advantages of the present invention will be apparent from the specification and appended claims.

It has been discovered in accordance with the present invention that alkenyl esters are obtained by reacting an aliphatic carboxylic acid anyhdride and an olefin represented by the formula

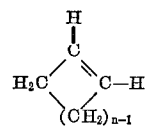

wherein R is defined as above, or by the formula

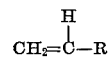

wherein $n$ is defined as above, in the presence of mercuric iodate. Representative of the alkenyl esters obtained by the process of the present invention include allyl acetate, 2-octen-1-ylpropionate, 2-cyclohexen-1-yl propionate, 2-decan-1-yl butyrate, 2-cyclopenten-1-yl stearate, 2-cyclo-octen-1-yl caproate, 2-propen-1-yl propionate, 2-buten-1-yl valerate, and the like.

DETAILED DESCRIPTION

In carrying out the process of the present invention, the aliphatic carboxylic acid anhydride and olefin represented by the formula

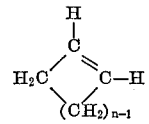

or the formula

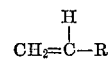

are reacted in the presence of mercuric iodate at a temperature and for a period of time to permit formation of the alkenyl ester.

The process of the present invention may be carried out over a wide temperature range, with a temperature in the range of from about 80 to about 180° C. being typically employed. Temperatures below about 80° C. are generally not practical because of the slow rate of reaction, while temperatures above about 180° C. tend to cause substantial decomposition of the mercuric iodate. A temperature in the range of from about 100 to about 160° C. is preferred.

The molar ratio of aliphatic carboxylic acid anhydride to olefin also may vary over a wide range with a molar ratio of anhydride to olefin of from about 10:1 to about 1:10 being generally preferred. The ratio of aliphatic carboxylic acid to mercuric iodate also may vary with a molar ratio of anhydride to mercuric iodate of from about 10:1 to about 1:10 also being generally preferred.

Any suitable aliphatic carboxylic acid anhydride may be employed in the process of the present invention. Typically suitable aliphatic carboxylic acid anhydrides are represented by the formula $(R^1CO)_2O$ wherein $R^1$ is an alkyl radical containing, for example, from 1 up to about 20 carbon atoms. Examples of such anhydrides include propionic anhydride, acetic anhydride, butyric anhydride, valeric anhydride, stearic anhydride, caproic anhydride, caprylic anhydride, etc., and the like.

The olefins which are employed in the process of the present invention are represented by the formula

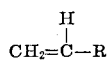

or

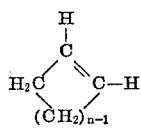

wherein R and $n$ are defined as above. Examples of such olefins include 1-octene, 1-decene, 1-pentene, cyclohexene, cyclooctene, cyclobutene, 1-propene, 1-octadecene, etc., and the like. The reaction of the present invention is conveniently carried out by dissolving the olefin and the mercuric iodate in the anhydride. If desired, or if the mercuric iodate or the olefin are not sufficiently soluble in the anhydride, a suitable solvent may be employed. Examples of such solvents include aliphatic acids, such as propionic acid and acetic acid, dichlorobenzene, dibromoethane, nitroethane, nitropentane, carbon tetrachloride, etc., and the like.

The alkenyl esters prepared in accordance with the process of the present invention may be recovered by any suitable procedure. Such procedures include distillation and solvent extraction.

The invention will be understood more fully by reference to the folowing specific examples. It is understood that the examples are presented for the purpose of illustration only and are not intended as a limitation of the invention. In the examples the aliphatic carboxylic acid anhydrides were dried before reaction over $P_2O_5$ at 100° C. under reduced pressure.

EXAMPLE 1

To a 50 ml. two-necked, round-bottom reaction flask containing 1.82 grams (0.014 mole) propionic anhydride were added 1.93 grams (0.0035 mole) mercuric iodate and 1.15 grams (0.014 mole) cyclohexene. A Dry Ice-acetone condenser was attached to the reaction flask. The resulting solution in the flask was heated with agitation in an oil bath to approximately 110° C.–115° C. and maintained at that temperature for approximately six hours. At the end of the six hour period, the solution was heated to approximately 135° C. and maintained at that temperature for approximately two hours. Upon cooling to room temperature the solution was placed in a Dry Ice-acetone bath and then swept with a stream of nitrogen for approximately 3½ hours. The solution was filtered to remove mercuric iodide and then washed with 1 N sodium hydroxide to remove propionic anhydride. 2-cyclohexen-1-yl propionate, B.P. 75° C. at 11 mm., was obtained.

EXAMPLE 2

The procedure of Example 1 was repeated in all essential details with the exception that 1-octene was substituted for cyclohexene. Trans-2-octen-1-yl propionate and 1-octen-3-yl propionate were obtained.

EXAMPLE 3

Essentially the same procedure used in Example 1 is employed except that cyclopentene is is substituted for cyclohexene to make 2-cyclopenten-1-yl propionate.

EXAMPLE 4

Essentially the same procedure used in Example 1 is employed except that 1-decene is substituted for cyclohexene and caproic anhydride is substituted for propionic anhydride to make 2-decen-yl caproate.

EXAMPLE 5

The experiment of Example 1 is repeated except that propene is substituted for cyclohexene and acetic anhydride is substituted for propionic anhydride to make allyl acetate.

Since many embodiments of this invention may be made and since many changes may be made in the embodiments described, the foregoing is to be interpreted as illustrative only and the invention is defined by the claims appended hereto.

What is claimed is:

1. A process for the preparation of alkenyl esters comprising reacting an aliphatic carboxylic acid anhydride corresponding to the formula $(R^1CO)_2O$ wherein $R^1$ is an alkyl radical containing from 1 to about 20 carbon atoms and an olefin represented by the formula

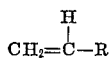

wherein R is hydrogen or an alkyl radical having from 1 to about 25 carbon atoms, or by the formula

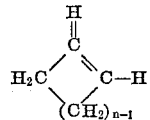

wherein $n$ is an integer ranging from 1 to about 10, in the presence of mercuric iodate at a temperature in the range of from about 80 to about 180° C.

2. The process of claim 1 wherein the reaction is carried out at a temperature in the range of from about 100 to about 160° C.

3. The process of claim 1 wherein the olefin is represented by the formula

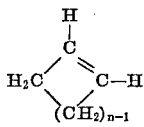

wherein $n$ is an integer ranging from about 1 to about 10.

4. The process of claim 1 wherein the olefin is represented by the formula

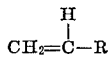

wherein R is hydrogen or an alkyl radical having from 1 to about 25 carbon atoms.

References Cited

UNITED STATES PATENTS

| | | | |
|---|---|---|---|
| 3,299,110 | 1/1967 | Pine | 260—497 R |
| 3,393,225 | 7/1968 | Fenton | 260—497 R |
| 3,463,740 | 8/1969 | Ketley et al. | 260—497 A |
| 3,479,392 | 11/1969 | Stein et al. | 260—497 A |

JAMES A. PATTEN, Primary Examiner

R. D. KELLY, Assistant Examiner

U.S. Cl. X.R.

260—410, 410.9 R

UNITED STATES PATENT OFFICE
CERTIFICATE OF CORRECTION

Patent No. 3,641,122            Dated February 8, 1972

Inventor(s) Gustave B. Bachman and Gerald M. Tullman

It is certified that error appears in the above-identified patent and that said Letters Patent are hereby corrected as shown below:

Column 1, line 72, after the formula insert --or--.

Column 2, line 28, "decan" should be --decen--.

Column 3, line 33, "folowing" should be --following--.

Column 4, line 28, that portion of the formula reading
$\overset{H}{\underset{C}{\|}}$ should read $\overset{H}{\underset{C}{|}}$ Signed and sealed this 11th day of July 1972.

(SEAL)
Attest:

EDWARD M. FLETCHER, JR.            ROBERT GOTTSCHALK
Attesting Officer                       Commissioner of Patents